United States Patent [19]

Griffin et al.

[11] Patent Number: 4,723,504
[45] Date of Patent: Feb. 9, 1988

[54] POINTER AND SHAFT ASSEMBLY

[75] Inventors: Ranald L. Griffin; Louis E. Goodenough; Michael F. Robertson, all of Huntsville, Ala.

[73] Assignee: Chrysler Motors Corporation, Highland Park, Mich.

[21] Appl. No.: 824,892

[22] Filed: Jan. 31, 1986

[51] Int. Cl.⁴ .................................................. G01D 13/22
[52] U.S. Cl. ........................................ 116/332; 116/328; 116/DIG. 6; 29/453
[58] Field of Search ........ 116/332, 328, 327, 329–331, 116/DIG. 5, DIG. 6, DIG. 23; 29/453; 177/173, 174; 368/238; 403/354, 361

[56] References Cited

U.S. PATENT DOCUMENTS

| | | | |
|---|---|---|---|
| 892,021 | 6/1908 | Wirsching | 116/328 |
| 1,011,285 | 12/1911 | Verplast | 116/331 |
| 2,605,737 | 8/1952 | Brown et al. | 116/328 |
| 3,130,705 | 4/1964 | Ingham | 116/328 |
| 3,142,148 | 7/1964 | Morgan et al. | 116/332 |

FOREIGN PATENT DOCUMENTS

| | | | |
|---|---|---|---|
| 3435377 | 9/1985 | Fed. Rep. of Germany | 116/328 |
| 149081 | 11/1980 | Japan | 368/238 |
| 660932 | 11/1951 | United Kingdom | 368/238 |

*Primary Examiner*—Charles Frankfort
*Assistant Examiner*—W. Morris Worth
*Attorney, Agent, or Firm*—Kenneth H. MacLean, Jr.

[57] ABSTRACT

An improved pointer and shaft adapter assembly for use in instruments such as the speedometer of a vehicle including an elongated pointer portion and shaft forming portion connected together by engagement between spaced tabs which project from the pointer lying alongside side wall surfaces of an end connector of the shaft adapter. Cooperative nibs and apertures of the pointer and shaft forming portions secure the parts together and prevent any substantial tilting movement therebetween.

5 Claims, 9 Drawing Figures

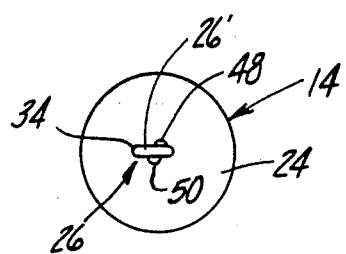
Fig-5
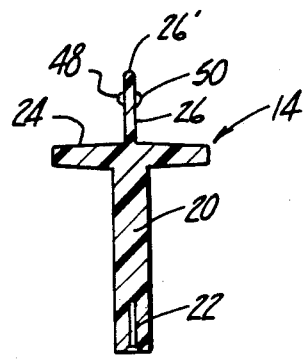
Fig-6
Fig-7
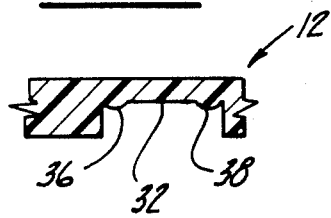
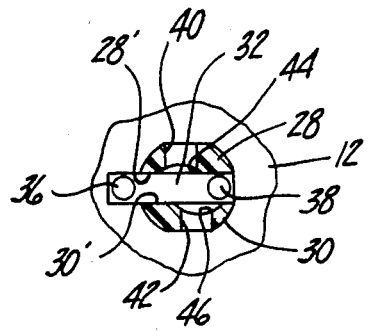
Fig-8
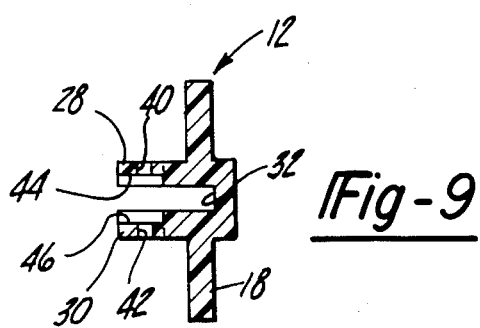
Fig-9

POINTER AND SHAFT ASSEMBLY

BACKGROUND OF THE INVENTION

This invention relates to a readily assembled two-part shaft and pointer assembly such as used in instruments such as a vehicle speedometer. Features of the invention permit relatively good attachment between a shaft part and a pointer part without substantial rocking or tilting movement therebetween.

Also, the design only permits mounting the pointer part on the adapter part in one way, thus avoiding undesirable backward assembly. In addition, the design of the part permits the parts to be disassembled easily and without undue stress put on the parts which could cause breakage.

There are many known ways of connecting an instrument pointer to a shaft. The most common method is probably to provide a hollow cylindrical recess in the pointer assembly into which a shaft extends. This way of attaching the shaft to the pointer does not permit easily assembly and disassembly between the parts.

SUMMARY OF THE INVENTION

The subject design of the shaft adapter and the mating pointer assembly includes a particular recessed channel formed in the pointer assembly which receives a shaped end portion of the shaft adapter to establish a normal relationship between the elongated pointer part and the shaft adapter part. In addition, the pointer assembly includes spaced projections which extend along either side of the shaft adapter thus maintaining the parts in normal relation and preventing rocking of the shaft on the end of the adapter. Each projection includes a recess or aperture therein and nonaligned with one another or the center line of projections of the elongated pointer assembly. Correspondingly, the end of the shaft adapter includes projecting nibs thereon adapted to extend into the recess or apertures of the projections from the pointer assembly thus securing the pointer assembly and shaft adapter together. Finally, the engagement between the end of the shaft adapter and the pointer assembly is established in a positive and accurate relationship one to another by means of arcuate nibs formed on the bottom walled surface of the channel into which the end of the shaft adapter extends. Thus, the contact between the pointer assembly and the shaft adapter is established by contact between the end of the shaft adapter and the upper surfaces of these two spaced nibs, thus preventing any inaccuracies which might be caused by undesirable foreign matter which may have entered the channel prior to assembly.

Further advantageous features of the subject design and method of joining the pointer assembly and shaft adapter will be more readily apparent from a reading of the following Detailed Description of a Preferred Embodiment which is shown in the accompanying drawings as described hereinafter.

IN THE DRAWINGS

FIG. 5 is a top planar view of the shaft adapter;

FIG. 6 is a sectioned elevational view of the shaft adapter taken along section lines 6—6 in FIG. 4 and looking in the direction of the arrows;

FIG. 7 is an enlarged sectional view of the pointer taken along section lines 7—7 in FIG. 3 and looking in the direction of the arrow;

FIG. 8 is an enlarged sectional view of a portion of the pointer assembly taken along section line 8—8 in FIG. 2 and looking in the direction of the arrows;

FIG. 9 is an enlarged sectional view of the pointer assembly taken along section line 9—9 in FIG. 3 and looking in the direction of the arrows.

DETAILED DESCRIPTION OF A PREFERRED EMBODIMENT

Figure 1:
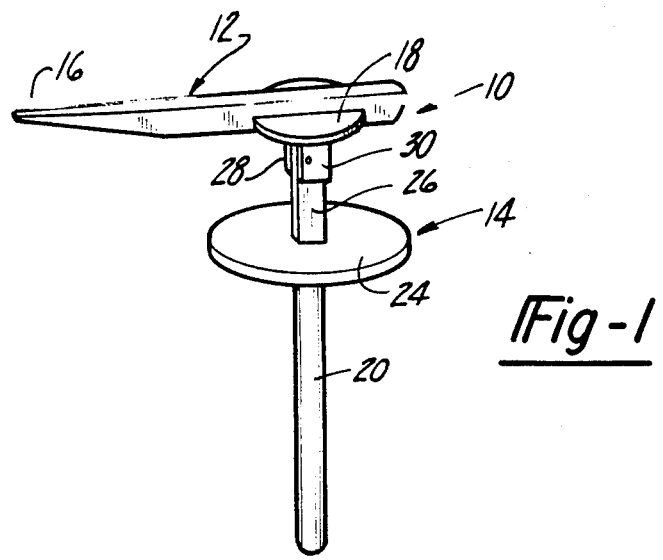
FIG. 1 is a perspective view of the pointer and shaft adapter assembled together.

In FIG. 1 of the drawings, a pointer and shaft adapter assembly 10 is illustrated. This assembly is commonly utilized in instruments such as the speedometer of a vehicle. The assembly 10 includes two basic parts, the pointer assembly 12 and a shaft adapter assembly 14. It is desirable to attach the parts 12 and 14 together in a manner permitting easy assembly and disassembly resulting in a precise and accurate connection therebetween characterized by a lack of tipping or rocking of the pointer portion 12 relative to the axis of the adapter portion 14.

The pointer portion of the assembly 12 is an elongated member with an indicator end portion 16 adapted to overlie a semi-circular or circular indicia dial such as the speed of a vehicle arranged in a generally circular pattern. As the pointer assembly 12 is moved by rotation of the shaft adapter portion 14, the end 16 overlies a desired indicia indicating the speed of a vehicle, for instance. The pointer portion 12 includes a generally circular portion 18 molded integrally with the elongated portion thereof which overlies an attachment portion located off the bottom of the pointer assembly 12. This concealment provides for a desirably attractive indicator assembly.

Figure 4:
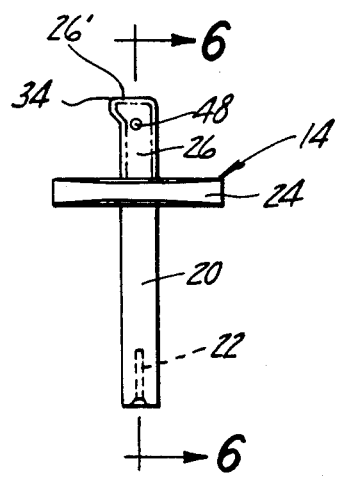
FIG. 4 is a side elevational view of the shaft adapter portion of the assembly.

The shaft adapter portion 14 of the assembly 10 in FIG. 1 includes a generally cylindrical shaft portion 20, the lower end of which in FIG. 4 reveals an axially extending blind bore 22 which is adapted to insertably receive the free end of a shaft for inputting rotative movement to the pointer and shaft adapter assembly 10. In the case of a vehicle speedometer, the rotative input shaft would be an extension of the output of the commonly used magnetic force transmission mechanism of vehicle speedometers. This mechanism transforms the purely rotative input to the speedometer assembly into a force and rotative positioning means for the shaft adapter and pointer assembly 10. This type of device has been used for some time in vehicle speed indicating systems and the subject pointer and shaft adapter assembly is not limited to use with such a device.

The shaft adapter portion 14 of the assembly 10 also includes a generally enlarged circular disk portion 24 which overlies an entrance bore or aperture means through which the shaft portion 20 of the assembly extends thereby concealing the central portion of an associated indicia dial such as the speedometer dial of a vehicle. Also, the shaft adapter portion 14 includes an upper connector or support end portion 26 having a generally rectangular cross section as best shown in FIGS. 4-6. As can be seen generally in FIG. 1, the upper rectangular end portion 26 of the shaft adapter 14 connects to the portion of the pointer assembly 12 in the vicinity beneath the circular disk portion 18. Specifically, two projections or tabs 28 and 30 extend normally from the axis of the elongated pointer assembly 12 and in a generally parallel direction with respect to the axis of the shaft adapter 14. The tabs 28 and 30 extend closely along the parallel faces of the rectangularly shaped connecting end portion 26 of the shaft assembly 14 as shown in more detail and explained hereinafter with reference to FIGS. 2-9.

Figure 2:
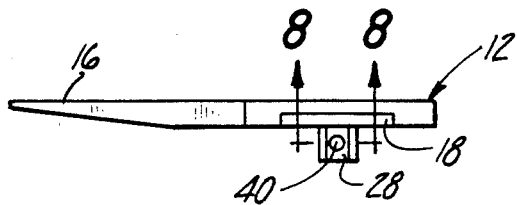
FIG. 2 is a side elevational view of the pointer portion of the assembly.
Figure 3:
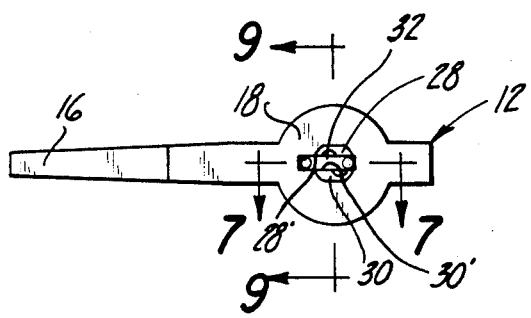
FIG. 3 is a bottom planar view of the pointer.

In the FIGS. 2 and 3, the pointer assembly 12 reveals the tabs 28 and 30 in more detail. The tabs 28 and 30 have parallel inside faces 28' and 30' which are spaced to provide a reception for the upper end connecting portion 26 of the shaft adapter 14 as shown in FIG. 4. Further, as best shown in FIGS. 7-9, the pointer assembly 12 has an elongated channel means 32 mold-formed therein. The length of the channel 32 shown in FIG. 3 and in the enlarged views 7 and 8 corresponds to an elongated end surface 26' of the end portion 26 of the shaft adapter 14. The elongated portion 26' is formed by an extension 34 on one side of the end portion 26. As best shown in FIGS. 7 and 8, the ends of the channel 32 are each provided with a rounded nib or projection 36 and 38, respectively. The nibs 36, 38 form a spaced contact between the pointer assembly 12 and the end surface 26' of the shaft adapter portion 14 characterized by a reliably steady spaced contact therebetween. Thus, any foreign material which may have entered the channel 32 prior to assembly does not affect the accurate contact between the raised nibs 36, 38 and the end surface 26' of the shaft assembly 14. Even absent any inclusion of foreign matter in the channel 32, the nibs 36 and 38 provide a steady spaced contact support for the pointer assembly 12 on the end of the shaft adapter portion 14.

The pointer portion 12 of the assembly 10 is secured to the end 26 of the shaft adapter portion 14 partially by the close contact between the parallel interior wall portions 28' and 30' of the tabs 28 and 30, respectively, as they contact the side surfaces of the end connecting portion 26 of the shaft adapter 14. The portions 12 and 14 are positively held together by means to be described hereinafter. Specifically, as is shown in FIGS. 8 and 9, the tabs 28 and 30 of portion 12 include apertures 40 and 42 extending through tabs 28 and 30, respectively. Also, the tabs 28 and 30 are provided with rounded grooves 44 and 46, respectively, which extend normal to the apertures 40 and 42, along the projections 28 and 30.

The aforedescribed grooves 44, 46 and associated apertures 40, 42 are adapted to cooperatively engage oppositely projecting nibs 48, 50 extending from the side walled surfaces of the rectangular end portion 26 of the shaft adapter 14. As may be seen in FIGS. 5 and 8, nibs 48 and 50 are offset one with respect to the other in a horizontal direction. The apertures 40 and 42 are likewise offset for receiving nibs 48 and 50 respectively. As the pointer portion 12 of the assembly 10 is inserted over the end portion 26 of the shaft adapter 14, the nibs 48 and 50 engage the curved channels 44 and 46 in the tabs 28 and 30, respectively, so that the pointer assembly 12 can be inserted thereover without undue stress to the tab portions 28 and 30. When the upper end surface 26' of the shaft adapter portion 14 engages the nibs 36 and 38 in the bottom of the channel 32 of the pointer assembly 12, the nibs 48 and 50 on the end portion 26 of the shaft adapter 14 are aligned with the apertures 40 and 42 in the tabs 28 and 30, respectively. During this insertion of the end 26 between the tabs 28 and 30, the tabs are slightly flexed away from one another. However, when the parts 12 and 14 are fully joined together with the end portion 26' engaging the nibs 36 and 38, nibs 48 and 50 of the shaft adapter 14 extend into the apertures 40 and 42, respectively, allowing the projections or tabs 28 and 30 to spring back toward one another and engage the opposite surfaces of the end portion 26. This provides a relatively rigid connection between portions 12 and 14 to minimize rocking or tilting movement of the pointer portion 12 relative to the axis of the shaft adapter portion 14.

Although only one embodiment of the pointer and shaft assembly has been illustrated in the drawings and described in detail, modifications of the pointer and shaft adapter assembly are readily contemplated which would still fall within the scope of the following claims which define the invention of this application.

We claim:

1. In an instrument for visually indicating information by means of an overlying movable pointer, a pointer and shaft adapter assembly in the form of two readily attached and disengaged portions, comprising:

a pointer portion of the assembly including an elongated member, one end portion of which is adapted to provide indicating information to be visually transmitted;

the pointer portion of the assembly including an attachment part including a pair of tabs extending normally with respect to the elongated member and in parallel and spaced relation to one another for defining adjacent and facing side surfaces separated by a clearance space therebetween;

a shaft adapter portion of the assembly adapted to be operably connected to the pointer portion and including a connecting end portion having a generally rectangular cross-section adapted to extend into the clearance space of the pointer portion and with opposite side surfaces adapted to closely engage the adjacent and facing side surfaces of the projecting tabs of the pointer portion and an end surface which engages the pointer portion;

each adjacent side surface of the projecting tabs of the pointer portion having aperture means extending therein and each side surface of the connecting end portion of the shaft adapter portion having a projecting nib formed thereon, each nib projecting from the side surface of the shaft adapter portion and into a correspondingly positioned aperture means in the engaged adjacent side surface of the tab when the pointer and shaft adapter portions are fully and operably connected thereby providing a relatively stable support for the pointer portion to prevent tilting thereof with respect to a longitudinal axis of the shaft adapter portion.

2. The assembly set forth in claim 1 in which the pointer portion also includes channel means extending in the body of the pointer portion between the tabs as a continuation of the clearance space and parallel to the adjacent and facing side surfaces of the tabs for receiving the end surface of the connecting end portion of the shaft adapter portion.

3. The assembly set forth in claim 2 in which the channel means includes a bottom wall with spaced nibs projecting therefrom adapted to engage spaced portions of the connecting end portion of the shaft adapter portion.

4. The assembly set forth in claim 2 in which the connecting end portion of the shaft adapter portion includes an offsetting projection projecting radially of the longitudinal axis of the connecting end portion whereby said connecting end portion is so placed and configured with respect to the configuration of the channel means to permit the pointer and shaft adapter portions to be insertably connected together in only one of two orientations characterized by alignment between each of the aperture means in the tab projections of the pointer portion and the correspondingly positioned nibs extending from the opposite side surfaces of the connecting end portion of the shaft adapter portion.

5. The assembly set forth in claim 1 in which the nibs projecting from the opposite side surfaces of the connecting end portion of the shaft adapter portion are positioned in a non-aligned relation with respect to the longitudinal axis of said adapter portion and, accordingly, the aperture means in the projecting tabs of the pointer portion are correspondingly non-aligned in conformity with the positions of the nibs whereby when the nibs of the connecting end portion extend into the corresponding aperture means of the projecting tab of the pointer portion, the pointer and shaft adapter portions are connected normally to one another and prohibited from any substantial relative angular movement by the engagement between the nibs and apertures.

* * * * *